H. L. DOHERTY.
APPARATUS FOR REMOVING SUSPENDED MATTER FROM GASEOUS FLUIDS.
APPLICATION FILED APR. 4, 1912.

1,212,193.

Patented Jan. 16, 1917.
5 SHEETS—SHEET 1.

H. L. DOHERTY.
APPARATUS FOR REMOVING SUSPENDED MATTER FROM GASEOUS FLUIDS.
APPLICATION FILED APR. 4, 1912.

1,212,193. Patented Jan. 16, 1917.
5 SHEETS—SHEET 2.

Fig. 3.

H. L. DOHERTY.
APPARATUS FOR REMOVING SUSPENDED MATTER FROM GASEOUS FLUIDS.
APPLICATION FILED APR. 4, 1912.

1,212,193.

Patented Jan. 16, 1917.
5 SHEETS—SHEET 4.

UNITED STATES PATENT OFFICE.

HENRY L. DOHERTY, OF NEW YORK, N. Y.

APPARATUS FOR REMOVING SUSPENDED MATTER FROM GASEOUS FLUIDS.

1,212,193.  Specification of Letters Patent.  Patented Jan. 16, 1917.

Original application filed April 13, 1911, Serial No. 620,861. Divided and this application filed April 4, 1912. Serial No. 688,538.

*To all whom it may concern:*

Be it known that I, HENRY L. DOHERTY, a citizen of the United States, and a resident of New York city, in the county of New York and State of New York, have invented certain new and useful Improvements in Apparatus for Removing Suspended Matter from Gaseous Fluids, of which the following is a specification.

This invention relates to an apparatus for removing suspended matter from gaseous fluids, and, in particular, to a type of apparatus in which the gaseous current is caused to follow a spiral path.

The object of my invention is to provide an improved means for separating from a gaseous current substantially all of the suspended liquid and solid particles which it contains, with special reference to the removal of tar and dust particles from illuminating gas.

This application is a division of my application Ser. No. 620,861, filed April 13th, 1911, in which latter I claim the process involved.

In my invention which is the subject of Letters Patent No. 798667, dated Sept. 5th, 1905, I have revealed an apparatus for accomplishing the above object by passing the gaseous current through a helical passage at a rapid rate, whereby a rapid rotary motion is given to the current and the suspended liquid and solid particles are thrown off by the centrifugal force thus developed. In my co-pending applications Ser. Nos. 535842 and 535843, filed Dec. 31st, 1909, I have shown improvements on the invention referred to above by virtue of which I am enabled to communicate a whirling motion to the gas by causing it to traverse a spiral passage.

This present invention relates to a modification of the latter invention by virtue of which I am enabled to communicate a whirling motion to the gas first in one direction and then in the other by causing it to traverse a double spiral passage—the gas passing through one passage from the peripheral to the inner extremity of the one passage and thence back to the peripheral extremity of the other passage, or vice versa.

In the accompanying drawings, Fig. 6 is also an enlarged cross-section of the apparatus taken on a horizontal plane through the line E—F of Fig. 1, also showing the liquid-supplying device. In Figs. 7, 8, 9 and 10 I have shown another form of my invention in which the spiral passages are built in a tank arranged to work like the lift of a gas holder. This is counter-weighted so as to expose to the gas the area of passage desired for a given volume of flow. Any variation in the volume flowing causes a movement of the lift, which increases the area of the spiral passage exposed when the volume of gas increases and diminishes the free area of the passage when the volume of gas flowing diminishes. Aside from the method of varying the area of the passage according to the volume of gas flowing, however, the apparatus is identical in method of operation with the apparatus of the foregoing figures. In this modified form of my invention, Fig. 7 shows a vertical section of the lift and tank of the apparatus on the line A'—B' of Fig. 8. Fig. 8 shows a horizontal cross-section of the same on the line C'—D' of Fig. 7. Fig. 9 is a part elevation of the apparatus, while

Figures 1, 2, 5:
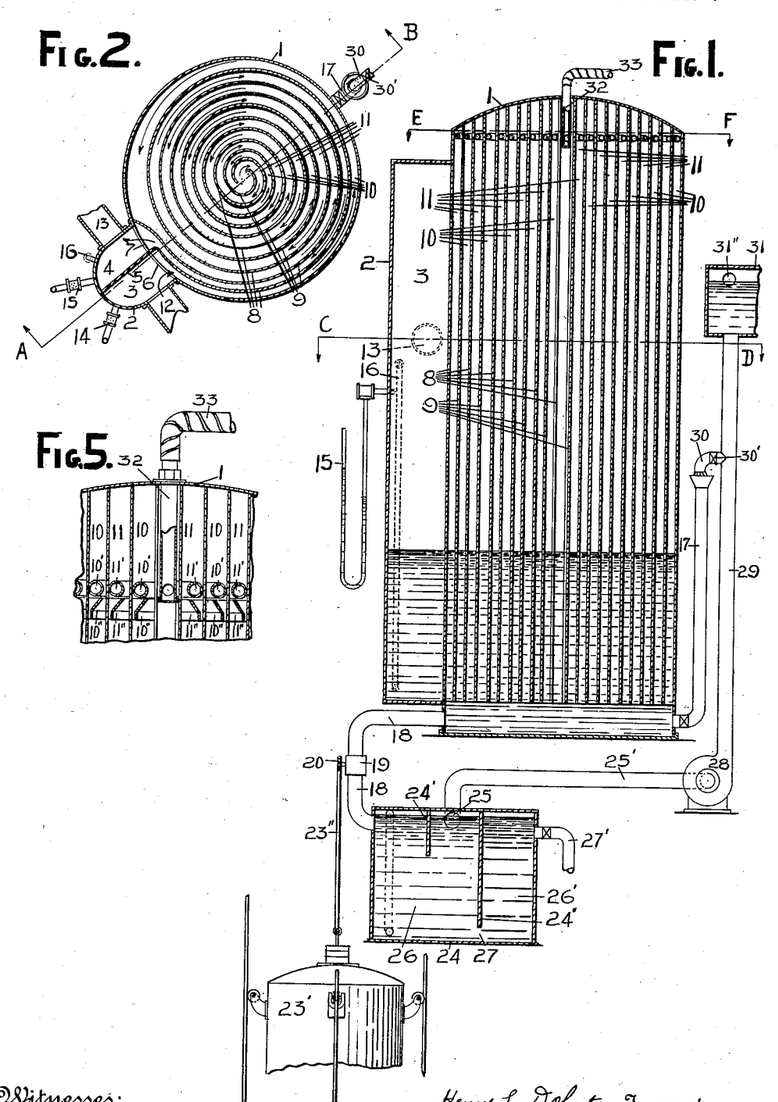
Figure 1 is a vertical cross-section of the apparatus on the line A—B of Fig. 2.
Fig. 2 is a horizontal cross-section on the line C—D of Fig. 1.
Fig. 5 is a part vertical diametral cross-section on an enlarged scale of the upper portion of the apparatus showing the device for providing a film of liquid on the spiral surface when the gas treated does not contain liquid in suspension, or when it is desired to treat the gas with an absorbent liquid of special character.

1 designates the separating chamber proper. Attached to 1 is a sheet, 2, having a partition, 5, which forms the gas inlet and outlet chambers, numbered 3 and 4 respectively. A vertical slot is cut in the wall of chamber 1 which extends the full height of chambers 3 and 4 and forms the gas inlet and outlet ports, numbered 6 and 7 respectively. Attached to partition 5 is the peripheral termination of a spiral wall, 8. Another spiral wall, 9, parallel to 8, is attached to the wall of 1 at the side of port 7. There are thus formed two spiral passages, 10 and 11, which serve as inflow and outflow passages for the gas. As shown, these passages are in communication at the axial part of 1 and may be used interchangeably. Passage 10 communicates with chamber 3 and passage 11 with chamber 4. With the arrangement of the apparatus shown, 12 is the gas inlet pipe, 13 the gas outlet pipe.

14 and 15 are pressure gages in communication, respectively, with chambers 3 and 4.

16 is a gage indicating the level of the liquid in tank 1.

17 is the pipe through which liquid is supplied to tank 1, and 18 is the pipe through which liquid is withdrawn from tank 1.

Figure 3:
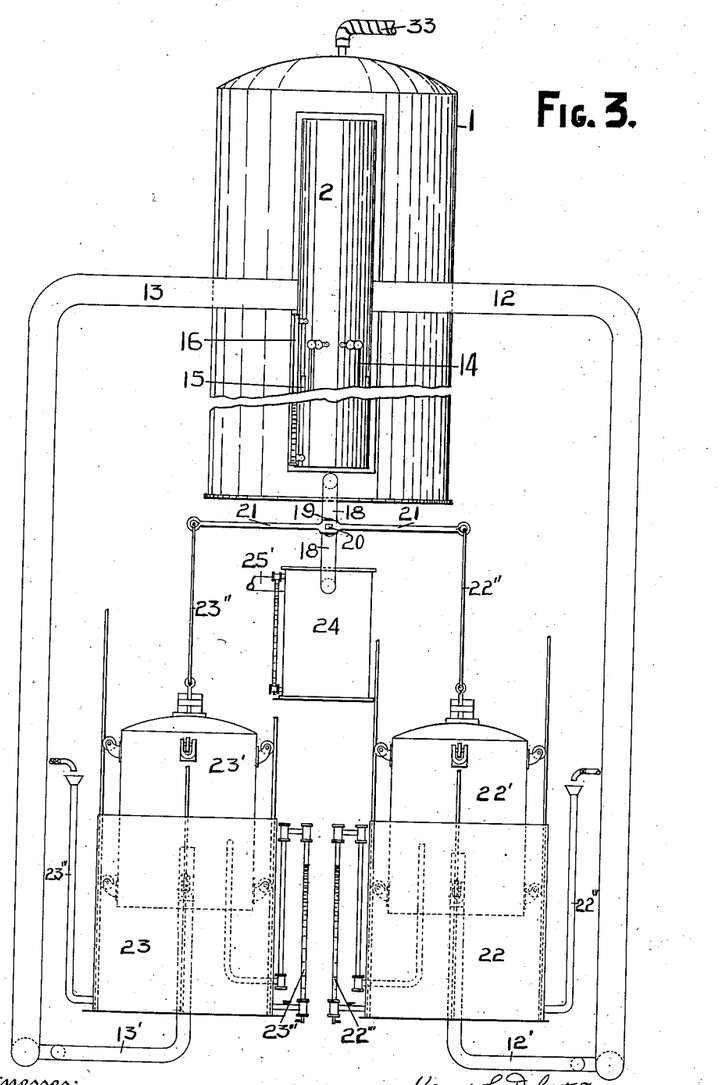
Fig. 3 is an elevation of the apparatus showing a device for regulating the water level therein, and hence the free area of the gas passage, according to the volume of gas flowing.
Figure 4:
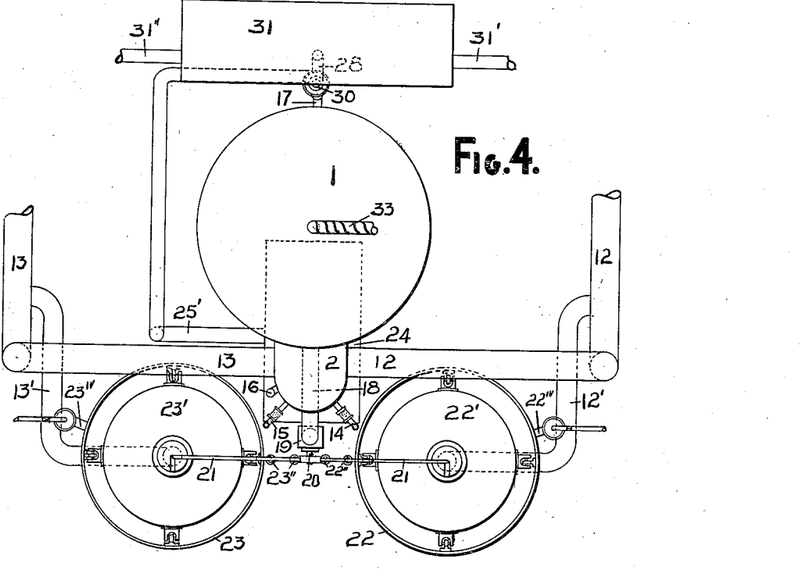
Fig. 4 is a plan of the whole apparatus.
Figures 7, 8, 9:
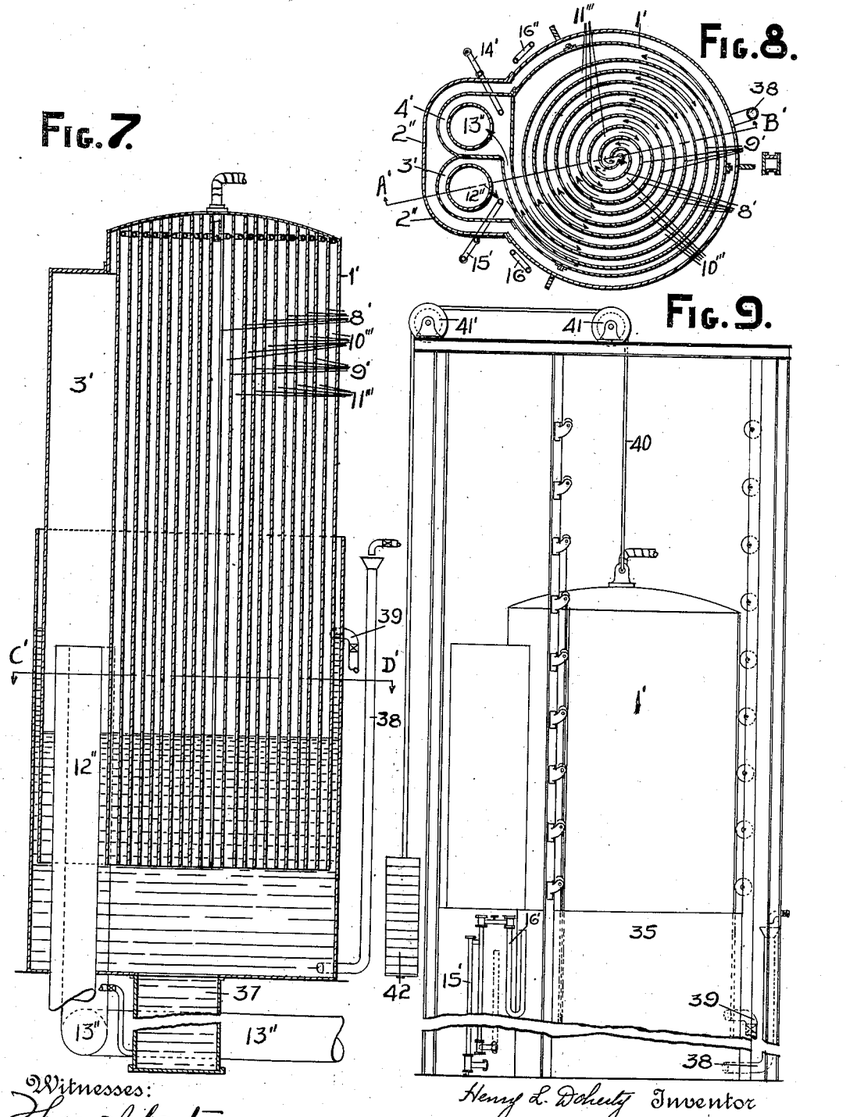
Figure 10:
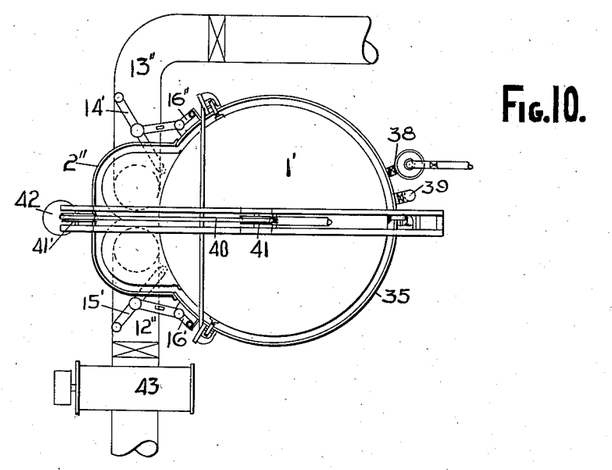
Fig. 10 is a plan of the same.

19 is a cock on 18 which is arranged to be actuated by the relative movement of the small gas-holders 22' and 23'. The stem, 20, of cock 19 bears the rocking arm 21. The ends of 21 are connected respectively with lifts 22' and 23' through suitable links, 22'' and 23''. The lifts 22' and 23' of gas-holders 22 and 23 are connected by pipes 12' and 13', respectively, with the gas inlet and outlet pipes 12 and 13, respectively. Gages 22''' and 23''' indicate the water level in the respective tanks. As required water may be supplied to the seals of the gas-holders 22 and 23 through the respective pipes $22^4$ and $23^4$.

24 is a tar separating chamber which separates the heavy tarry matter from the liquor drawn off from the separator. A baffle-plate, 24', in 24 prevents the direct flow of liquor from the inlet pipe 18 to the outlet 25.

24'' is another baffle reaching nearly to the bottom of 24 but leaving a passage, 27, through which the tar chamber 26' and the liquor chamber 26 communicate. The tar collects in the bottom of 26 and passes thence into 26' through 27 as tar is withdrawn through 27'. The tar-free liquor is drawn off from 24 through the pipe 25 and raised by the circulating pump 28 to the reservoir 31 through the pipe 29. Any surplus liquor which enters the system by condensation from the gas, or otherwise, is withdrawn through the overflow 31''. The circulating pump 28 is thus always discharging against the head of liquid in reservoir 31. The reservoir 31 should have a capacity such that the level of the liquid will not be materially affected by fluctuations in the circulation of the liquid, in order that a fairly constant head may be maintained on the valve 30'. When the liquid passing through the pump is below the normal quantity the deficiency is supplied by the liquid in 31. When the liquid passing through the pump is greater than the normal quantity the excess enters the reservoir 31, again filling the latter.

10' and 11' are two pipes placed respectively in the spiral passages 10 and 11 through which water or any other liquid may be supplied to establish a film of liquid on the spiral walls of the separator when the gas itself does not contain liquid in suspension. Such extraneous liquid is supplied to the separator through the pipes 33 and 32. Deflecting sheets, 10'' and 11'', respectively, cause the liquid discharged from 10' and 11' to follow the respective spiral walls.

In the operation of the apparatus, the gas is conducted to the separator through the pipe 12, flows through the chamber 3 and the spiral passage 10 to the central portion of the chamber 1, back through the spiral passage 11 to the gas outlet chamber 7 and thence discharges through the pipe 13. The movement of the gas may be effected either by induced or forced draft, the requirement being simply that there should exist a sufficient difference in pressure between 12 and 13 to impart the required velocity to the gas. In this embodiment of my invention the method of operation is as follows: Water is supplied to 1 from 31 through the pipes 30 and 17 until the gage 16 shows that the proper normal level of the liquid has been attained. The pump 28 is now started and cock 19 adjusted to its normal position. Additional water, if necessary, is run into tank 31 through pipe 31'. Valve 30' is adjusted so that the liquid just fails to flow through pipe 31''. The lifts 22' and 23' of gas holders 22 and 23 are now connected up to the rocking arm 21 and the gas turned on through the pipe 12 under the necessary pressure. The gas enters the outer convolution of passage 10, passes to the center of the tank 1, as already described, and thence back through the passage 11 to the outlet chamber 4, from which it discharges through the passage 13. As the gas passes toward the center of the separator 1 it takes on a higher and higher angular velocity. Returning to the periphery through the passage 11 the angular velocity of the gas diminishes with the increase in the radius of the circular path which it is traversing. From 4, the gas passes to any other condensing and purifying apparatus which may be used. During its passage through the separator, the angular velocity communicated to the gas generates sufficient centrifugal force to throw the suspended liquid or solid particles to the periphery of the gas stream and therefore into contact with the outer wall of the spiral. This soon becomes coated with a film of tar, which in turn assists in the removal of other tar globules from a fresh portion of the gas. The simple projection of dust particles against a vertical wall would not effect entirely their withdrawal from the gas stream as the buoyant effect of the current of gas moving at a high velocity and the contact friction between the gas and dust would sweep the particles along even while in contact with the wall of the passage. The tarry liquid, however, possesses a considerable surface tension, and adheres to the wall with considerable tenacity—sufficient, in fact, to resist the tendency that the friction of the gas current has to sweep the deposited particles back into the current. This tarry film seizes the liquid globules and dust particles as they come in contact with the wall and withdraws them from the influence of the current of gas sweeping through the passage 7. As the deposit on the wall accumulates, the outer layer forms innumerable rivulets or a continuous film, which run off into the liquid seal in the bottom of 1. The force of adhesion between the tar and wall, however, suffices to keep the latter coated with a comparative thick continuous film. When the normal volume of gas is passing and the circulation of the liquid is normal, the lifts 22′ and 23′ are weighted so that the rocking arm 21 is horizontal and the system in equilibrium. If now the volume of gas supplied through 12 should increase the tendency is for the pressure in 12 to rise. This causes the lift 22′ of gas holder 22 to rise, rotating the arm 21 through a short arc from left to right. This increases the degree of opening of cock 10, permitting an increased quantity of water (or other sealing liquid) to waste through 18. Since the quantity supplied through 17 is constant, the result is that the level of the seal in 1 drops until the clear, unsealed area of passages 10 and 11 is sufficient to accommodate the increased volume of gas passing with the normal difference in pressure between 12 and 13. The result is that as the passages 10 and 11 unseal the pressure in 12 drops, which is followed by the downward movement of lift 22′ until the arm 21 again resumes its normal position, restoring the set of the regulating cock 19 to the position in which the discharge of liquid from 1 is equal to the inflow. The level of the seal again remains constant so long as the conditions remain unchanged. If now the volume of gas passing falls off, the difference in pressure between 12 and 13 diminishes, causing the lifts 22′ and 23′ to shift their positions in the reverse direction. This tends to close the regulating cock 19, with the result that the influx of liquid to 1 exceeds the discharge so that the seal rises, diminishing the free area of 10 and 11, until the difference in pressure between 12 and 13 has again reached the normal, when the valve 19 will have been restored to its normal set. The seal in 1 will again remain constant so long as the volume of gas passing remains constant.

The form of my invention shown in Figs. 7, 8, 9 and 10 differs from the one described above simply in the method employed in regulating the free area of the spiral passage according to the volume of gas passing. In this embodiment of my invention the regulation of the area of passages 10‴ and 11‴ is secured by arranging the chamber 1′ like the lift of a gas holder. 35 is the tank of the holder which contains the liquid seal and in which the lift 1′ moves. 2″ is the extension of tank 35 provided to inclose the walls of the inlet and outlet chambers 3′ and 4′, respectively, of the lift 1′. The spiral walls 8′ and 9′ form the spiral passages 10‴ and 11‴ communicating, respectively, with chambers 3′ and 4′. 12″ is the gas inlet pipe which communicates with 3′ above the level of the liquid therein, while 13″ is a similar pipe providing for the discharge of gas from chamber 4′. The lift 1′ is suspended by a suitable chain, 40, working over pulleys, 41 and 41′. A counterpoise, 42, attached to the other extremity of 40 permits of the adjustment of the unbalanced weight of the lift according to the average pressure under which the gas is supplied to 1′. 14′ and 15′ are gages to indicate the water level, while 16′ and 16″ indicate the gas pressure in chambers 3′ and 4′, respectively. 37 is a tar well. 38 a pipe through which water is supplied to the tank 35, and 39 an overflow connection for the discharge of surplus water from 35. The weight 42 is adjusted so that during a normal flow of gas the lift 1′ is immersed to the level desired. Any increase in the volume of gas passing tends to increase the resistance to the passage of the gas through 10‴ and 11‴, which increases the pressure of the gas, which in turn raises the lift 1′, unsealing a greater area of the passages 10‴ and 11‴. When the movement of the lift 1′ has sufficiently increased the free area of the passages the pressure again becomes normal. Any diminution in the volume of gas passing results in downward movement of 1′, reducing the area of the spiral passages and again bringing the pressure to normal. In all other respects the method of operation is the same as in the first embodiment of my invention.

Figure 11:
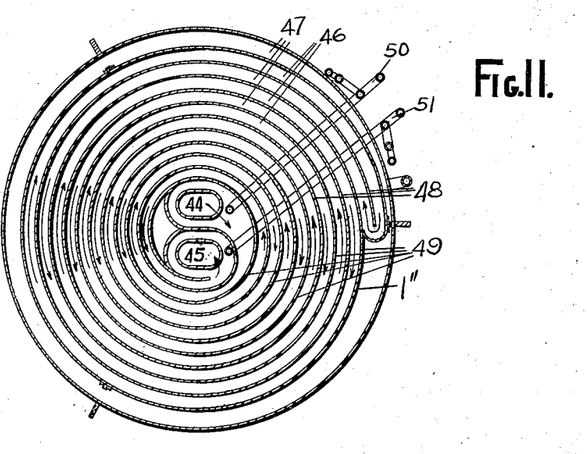
Fig. 11 shows the modification of the apparatus in which it is arranged for the gas to enter at the inner extremity of one passage and discharge from the apparatus through the inner extremity of the other passage.

In Fig. 11 I have shown a modification in which the gas is entered at and taken off from the separator at the axial portion thereof. In this 44 is the inlet pipe extending above the level of the liquid, when this arrangement is applied to the second embodiment of my invention, and communicating with spiral passage 46. 45 is a similar pipe communicating with passage 47. 48 and 49 are the walls of the spiral passage. 50 is the pressure gage on the gas inlet chamber and 51 the gage on the gas outlet chamber. From the foregoing description of the method of operation of the other forms of my invention a detailed description of this modification is superfluous.

Having described my invention, what I claim is:

1. In apparatus for separating from a gaseous fluid particles suspended therein, the combination of two spiral passages having their walls substantially parallel, means for varying the free area of said spiral passages according to the volume of gaseous fluid passing through the same in a given time, and inlet and outlet passages for gaseous fluid.

2. In apparatus for separating from a gaseous fluid particles suspended therein, the combination of two parallel spiral passages, the said passages being in communication with each other at their inner extremities, means for varying the free area of said passages according to the quantity of gaseous fluid passing through the same in a given time, and inlet and outlet passages for gaseous fluid.

3. In apparatus for separating from a gaseous fluid particles suspended therein, in combination, a plurality of spiral passages, means for varying the free area of said spiral passages according to the volume of gaseous fluid passing therethrough in a given time, and inlet and outlet passages for said gaseous fluid.

4. In apparatus for separating from a gaseous fluid particles suspended therein, the combination of a plurality of spiral passages, the said passages being so arranged as to provide a continuous path for the said gaseous fluid through said apparatus, means for varying the free area of said spiral passages according to the volume of gaseous fluid flowing through the same in a given time, a passage for the entrance of said gaseous fluid to said apparatus and a passage for the discharge of said gaseous fluid from said apparatus.

5. In apparatus for separating from a gaseous fluid particles suspended therein, the combination of two spiral passages, the said passages being so connected as to provide a continuous path for the said gaseous fluid through said apparatus, means for varying the free area of said spiral passages according to the volume of gaseous fluid flowing through the same in a given time, an inlet passage for the gaseous fluid at one extremity of one of said spiral passages and an outlet passage for the gaseous fluid at the corresponding extremity of the other of said spiral passages.

6. In apparatus for separating from a gaseous fluid particles suspended therein, the combination of two parallel spiral passages, the said passages being in communication at one of their corresponding extremities, a body of liquid sealing the bottoms of said passages, means for varying the depth of the sealing liquid relative to the depth of said spiral passages, and inlet and outlet passages for gaseous fluid.

7. In apparatus for separating from a gaseous fluid particles suspended therein, the combination of two parallel spiral passages, the said spiral passages being in communication with each other at their inner extremities, a body of liquid sealing the bottoms of said spiral passages, means for varying the depth of the sealing liquid relative to the depth of said spiral passages, and inlet and outlet connections for gaseous fluid.

8. In apparatus for separating from a gaseous fluid particles suspended therein, the combination of two parallel spiral passages, a body of liquid sealing the bottoms of said spiral passages, means for varying the depth of the sealing liquid relative to the depth of said spiral passages, an inlet passage for gaseous fluid connected with one of said spiral passages and an outlet passage for gaseous fluid connected with the other of said spiral passages.

9. In apparatus for separating from a gaseous fluid particles suspended therein, the combination of a plurality of spiral passages, a body of liquid sealing the bottoms of said spiral passages, means for varying the depth of said sealing liquid relative to the depth of said spiral passages, an inlet passage for gaseous fluid and an outlet passage for gaseous fluid.

10. In apparatus for separating from a gaseous fluid particles suspended therein, the combination of a plurality of spiral passages, the said passages being so connected as to provide a continuous path for the said gaseous fluid through said apparatus, a body of liquid sealing the bottoms of said spiral passages, means for varying the depth of said sealing liquid relative to the depths of said spiral passages, a passage for the entrance of said gaseous fluid to said apparatus and a passage for the discharge of said gaseous fluid from said apparatus.

11. In apparatus for separating from a gaseous fluid particles suspended therein, the combination of two spiral passages, the said passages being so connected as to provide a continuous path for the said gaseous fluid through said apparatus, a body of liquid sealing the bottoms of said passages, means for varying the depth of said sealing liquid relative to the depth of said passages, an inlet passage for the gaseous fluid at one extremity of one of said spiral passages and an outlet passage for the gaseous fluid at the corresponding extremity of the other of said spiral passages.

12. In apparatus for separating from a gaseous fluid particles suspended therein, the combination of two spiral passages which are in communication at one of their corresponding extremities, the said spiral passages being formed by two substantially vertical walls, the said walls being substantially parallel to each other and built in the form of a spiral, means for closing the tops of said spiral passages and means for sealing the bottoms of said spiral passages with a body of liquid of variable depth relative to said passages.

13. In apparatus for separating from a gaseous fluid particles suspended therein, the combination of two spiral passages which are in communication with each other at their inner extremities, the said spiral passages being formed by two substantially vertical walls, the said walls being substantially parallel to each other and built in the form of a spiral, means for closing the tops of said spiral passages and means for sealing the bottoms of said spiral passages with a body of liquid of variable depth.

14. In apparatus for separating from a gaseous fluid particles suspended therein, the combination of two substantially parallel spiral passages, the said spiral passages being formed by two substantially vertical walls, the said walls being substantially parallel to each other and built in the form of spirals, means for closing the tops of said spiral passages and means for sealing the bottoms of said spiral passages by a variable depth of liquid, an inlet passage for gaseous fluid connected with one of said spiral passages and an outlet passage for gaseous fluid connected with the other of said spiral passages.

15. In apparatus for separating from a gaseous fluid particles suspended therein, in combination, a plurality of spiral passages, the said passages being formed by a plurality of coöperating, substantially vertical walls, the said walls being parallel to each other and built in the form of spirals, means for closing the tops of said spiral passages and means for sealing the bottoms of said spiral passages by a body of liquid of variable depth.

16. In apparatus for separating from a gaseous fluid particles suspended therein, the combination of a plurality of spiral passages, said spiral passages being formed by a plurality of coöperating substantially vertical walls, means for closing the tops of said spiral passages and means for sealing the bottoms of said spiral passages by a body of liquid of variable depth, inlet passages for the entrance of said gaseous fluid to said apparatus and outlet passages for the discharge of gaseous fluid from said apparatus.

17. In apparatus for separating from a gaseous fluid particles suspended therein, the combination of a plurality of spiral passages which are so connected as to provide a continuous path for the said gaseous fluid through said apparatus, the said spiral passages being formed by a plurality of coöperating substantially vertical walls, the said walls being built along spiral curves, means for closing the tops of said spiral passages, and means for sealing the bottoms of said spiral passages by a variable depth of sealing liquid, a passage for conducting the gaseous fluid to said spiral passages and a passage for conducting the gaseous fluid away from said spiral passages.

18. In apparatus for separating from a gaseous fluid particles suspended therein, the combination of two spiral passages which are so connected as to provide a continuous path for the said gaseous fluid through said apparatus, the said spiral passages being formed by two substantially vertical walls, the said walls being built along a spiral curve, means for closing the tops of said spiral passages and means for sealing the bottoms of said spiral passages by a variable depth of liquid, an inlet passage for the gaseous fluid connected with one extremity of one of said spiral passages and an outlet passage for the gaseous fluid connected with the corresponding extremity of the other of said spiral passages.

19. In apparatus for separating from a gaseous fluid particles suspended therein, the combination of two spiral passages, which passages are in communication at one of their corresponding extremities, the said spiral passages being formed by two substantially vertical walls, the said walls being substantially parallel to each other and built along spiral curves, means for closing the tops of said spiral passages, a body of liquid sealing the bottoms of said spiral passages, and means for varying the depth of said sealing liquid relative to the depths of said spiral passages.

20. In apparatus for separating from a gaseous fluid particles suspended therein, the combination of two spiral passages, which passages are in communication with each other at their inner extremities, the said spiral passages being formed by two substantially vertical walls, the said walls being substantially parallel to each other and built along spiral curves, means for closing the tops of said spiral passages, a body of sealing liquid sealing the bottoms of said spiral passages and means for varying the depth of said sealing liquid relative to the depth of said spiral passages, an inlet passage for gaseous fluid connected with the peripheral extremity of one of said spiral passages, and an outlet for gaseous fluid connected with the peripheral extremity of the other of said spiral passages.

21. In apparatus for separating from a gaseous fluid particles suspended therein, the combination of two substantially parallel spiral passages, the said spiral passages being formed by two substantially vertical walls, the said walls being substantially parallel to each other and built in the form of spirals, means for closing the tops of said spiral passages, a body of sealing liquid closing the bottoms of said spiral passages, means for varying the depth of said sealing liquid relative to the depth of said spiral passages, an inlet passage for gaseous fluid connected with one of said spiral passages and an outlet passage for gaseous fluid connected with the other of said spiral passages.

22. In apparatus for separating from a gaseous fluid particles suspended therein, the combination of two spiral passages which are so connected as to provide a continuous path for the said gaseous fluid through said apparatus, the said spiral passages being formed by two substantially vertical walls, the said walls being built along spiral curves, means for closing the tops of said spiral passages, a body of liquid sealing the bottoms of said spiral passages, means for varying the depth of the said liquid relative to the depth of said spiral passages, an inlet passage for the gaseous fluid connected with one extremity of one of said spiral passages and an outlet passage for the gaseous fluid connected with the corresponding extremity of the other of said spiral passages.

23. In apparatus for separating from a gaseous fluid particles suspended therein, the combination of two spiral passages, which passages are in communication at one of their corresponding extremities, the said spiral passages being formed by two substantially vertical walls, the said walls being substantially parallel to each other and built in the form of a spiral, means for closing the tops of said spiral passages, a body of sealing liquid for sealing the bottoms of said spiral passages, and means for varying the height of the sealing liquid in said spiral passages inversely with the volume of gaseous fluid passing through said passages in a given time, an inlet passage for gaseous fluid connected with one end of one of said spiral passages, and an outlet for gaseous fluid connected with the corresponding end of the other of said spiral passages.

24. In apparatus for separating from a gaseous fluid particles suspended therein, the combination of two spiral passages which are in communication with each other at their inner extremities, the said spiral passages being formed by two substantially vertical walls, the said walls being substantially parallel to each other and built along spiral curves, means for closing the tops of said spiral passages, a body of liquid sealing the bottoms of said spiral passages, means for varying the height of the sealing liquid in said spiral passages inversely with the volume of gaseous fluid passing through said spiral passages in unit time, an inlet passage for gaseous fluid connected with one of said spiral passages and an outlet passage for gaseous fluid connected with the other of said spiral passages.

25. In apparatus for separating from a gaseous fluid particles suspended therein, in combination, a plurality of spiral passages, the said passages being formed by a plurality of coöperating, substantially vertical walls, the said walls being parallel to each other and built along spiral curves, means for closing the tops of said spiral passages, a body of sealing liquid sealing the bottoms of said spiral passages, means for varying the height of the sealing liquid in said spiral passages inversely with the volume of gaseous fluid passing therethrough in unit time.

26. In apparatus for separating from a gaseous fluid particles suspended therein, the combination of a plurality of spiral passages which are so connected that they provide a continuous path for the travel of the said gaseous fluid through said apparatus, the said spiral passages being formed by a plurality of coöperating substantially vertical walls, the said walls being built along spiral curves, means for closing the tops of said spiral passages, a body of liquid sealing the bottoms of said spiral passages, means for varying the height of the sealing liquid in said spiral passages inversely with the volume of gaseous fluid passing through said passages in unit time, a passage for conducting the gaseous fluid to said spiral passages and a passage for conducting the gaseous fluid away from said spiral passages.

27. In apparatus for separating from a gaseous fluid particles suspended therein, the combination of two spiral passages which are so connected as to provide a continuous path for the travel of the said gaseous fluid through said apparatus, the said spiral passages being formed by two substantially vertical walls, the said walls being built along spiral curves, means for closing the tops of said spiral passages, a body of sealing liquid sealing the bottoms of said spiral passages, means for varying the height of the sealing liquid in said spiral passages inversely with the volume of gaseous fluid passing through said passages in unit time, an inlet passage for the gaseous fluid connected with one extremity of one of said spiral passages and an outlet passage for the gaseous fluid connected with the corresponding extremity of the other of said spiral passages.

28. In apparatus for separating from a gaseous fluid particles suspended therein, the combination of two substantially parallel spiral passages, the said passages being in communication at one of their corresponding extremities, means for establishing a film of liquid on the walls of said spiral passages, means for conducting gaseous fluid to one end of one of said spiral passages, and means for conducting gaseous fluid away from the corresponding end of the other of said spiral passages.

29. In apparatus for separating from a gaseous fluid particles suspended therein, the combination of two substantially parallel spiral passages, the said passages being in communication with each other at their inner extremities, and means for establishing a film of liquid on the walls of said spiral passages, means for conducting gaseous fluid to the peripheral extremity of one of said spiral passages, and means for conducting gaseous fluid away from the peripheral extremity of the other of said spiral passages.

30. In apparatus for separating from a gaseous fluid particles suspended therein, the combination of two communicating parallel spiral passages, an inlet passage for gaseous fluid connected with one of said spiral passages, an outlet passage for gaseous fluid connected with the corresponding end of the other of said spiral passages, and means for establishing a film of liquid on the walls of said spiral passages.

31. In apparatus for separating from a gaseous fluid particles suspended therein, the combination of a plurality of spiral passages, means for moving said gaseous fluid through said plurality of spiral passages, and means for maintaining a film of liquid on the walls of said spiral passages.

32. In apparatus for separating from a gaseous fluid particles suspended therein, the combination of a plurality of spiral passages, the said passages being so connected as to provide a continuous path for the said gaseous fluid through said apparatus, means for causing the said gaseous fluid to traverse said plurality of passages, a passage for conducting gaseous fluid to said apparatus, a passage for conducting gaseous fluid away from said apparatus, and means for maintaining a film of liquid upon the walls of said spiral passages.

33. In apparatus for separating from a gaseous fluid particles suspended therein, the combination of two spiral passages, means for varying the free area of said passages according to the volume of gaseous fluid passing through the same in unit time, means for maintaining a film of liquid upon the walls of said spiral passages and means for causing the flow of gaseous fluid through said passages.

34. In apparatus for separating from a gaseous fluid particles suspended therein, the combination of two parallel spiral passages, the said passages being in communication with each other at their inner extremities, means for varying the free area of said passages according to the quantity of gaseous fluid passing through the same in unit time, means for maintaining a film of liquid on the walls of said spiral passages, an inlet passage communicating with the peripheral extremity of one of said spiral passages, and an outlet passage communicating with the peripheral extremity of the other of said spiral passages.

35. In apparatus for separating from a gaseous fluid particles suspended therein, the combination of two parallel spiral passages, the said passages being in communication at one of their corresponding extremities, and means for maintaining a body of liquid sealing the bottoms of said passages, means for varying the depth of the sealing liquid relative to the depth of said spiral passages, and means for maintaining a film of liquid on the walls of said spiral passages.

36. In apparatus for separating from a gaseous fluid particles suspended therein, in combination, a plurality of spiral passages, means for varying the free area of said spiral passages according to the volume of gaseous fluid passing therethrough, means for causing a flow of the said gaseous fluid through said spiral passages, and means for maintaining a film of liquid upon the walls of said spiral passages.

37. In apparatus for separating from a gaseous fluid suspended particles therein, the combination of two spiral passages, the said passages being so connected as to provide a continuous path for the said gaseous fluid through said apparatus, means for varying the free area of said spiral passages according to the volume of gaseous fluid flowing through the same in unit time, means for maintaining a film of liquid on the walls of said spiral passages, an inlet passage for gaseous fluid at one extremity of one of said spiral passages and an outlet passage for the gaseous fluid at the corresponding extremity of the other of said spiral passages.

38. In apparatus for separating from a gaseous fluid particles suspended therein, the combination of two spiral passages, which passages are in communication at one of their corresponding extremities, the said spiral passages being formed by two substantially vertical walls, the said walls being substantially parallel to each other and built along spiral curves, means for closing the tops of said spiral passages, a body of liquid sealing the bottoms of said spiral passages, means for varying the depth of said liquid relative to the depths of said spiral passages, and means for maintaining a film of liquid on the walls of said spiral passages.

39. In apparatus for separating from a gaseous fluid particles suspended therein, the combination of a plurality of spiral passages which are so connected that they provide a continuous path for the travel of the said gaseous fluid through said apparatus, the said spiral passages being formed by a plurality of coöperating, substantially vertical walls, the said walls being built along spiral curves, means for closing the tops of said spiral passages, a body of liquid sealing the bottoms of said spiral passages, means for varying the height of the sealing liquid in said spiral passages, inversely with the volume of gaseous fluid passing through said passages in unit time, means for maintaining a film of liquid upon the walls of said spiral passages, a passage for conducting the gaseous fluid to said spiral passages, a passage for conducting the gaseous fluid away from said spiral passages and means for causing a flow of the gaseous fluid through said spiral passages.

40. In apparatus for separating from a gaseous fluid particles suspended therein, the combination of two substantially spiral passages, the said passages being in communication at either their inner or peripheral extremities, and means for imparting to the said gaseous fluid a velocity of flow through said spiral passages of sufficient magnitude to generate the centrifugal force required to cause the suspended particles to contact with the outer walls of the said spiral passages.

41. In apparatus for separating from a gaseous fluid particles suspended therein, the combination of a gas holder, two parallel substantially vertical continuous spiral partitions attached to the top of the lift of said gas-holder, the lower edges of said spiral partitions terminating in the sealing liquid in the tank of said gas-holder, whereby two substantially parallel spiral passages are formed between the inner periphery of the said lift and the axis of the same, an inlet passage for the gaseous fluid communicating with one extremity of one of said spiral passages, an outlet passage for gaseous fluid communicating with the corresponding extremity of the other of said spiral passages, and a passage establishing communication between the other ends of the said spiral passages.

42. In apparatus for separating from a gaseous fluid particles suspended therein, the combination of a gas-holder, two parallel substantially vertical continuous spiral partitions attached to the top of the lift of said gas holder, the lower edges of said spiral partitions terminating in the sealing liquid in the tank of said gas holder, whereby two substantially parallel spiral passages are formed between the inner periphery of the said lift and the axis of the same, an inlet passage for the gaseous fluid communicating with one extremity of one of said spiral passages, an outlet passage for gaseous fluid communicating with the corresponding extremity of the other of said spiral passages, a passage establishing communication between the other ends of the said spiral passages, counterweights for so balancing the weight of the lift of said gas holder as to permit the same to be raised by an increase of gas pressure and lowered by a decrease in gas pressure, and means for causing a flow of gaseous fluid through said spiral passages.

Signed at New York city in the county of New York and State of New York this 3rd day of April A. D. 1912.

HENRY L. DOHERTY.

Witnesses:
 THOS. I. CARTER,
 LOUIS ANTONSANTI.